(12) United States Patent
Wilkinson

(10) Patent No.: US 11,542,177 B2
(45) Date of Patent: Jan. 3, 2023

(54) WATER MAIN RECIRCULATING SYSTEM WITH FILTER BY-PASS AND ISOLATION AND METHOD OF USING SAME

(71) Applicant: NO-DES, Inc., Los Lunas, NM (US)

(72) Inventor: Chris Eric Wilkinson, Los Lunas, NM (US)

(73) Assignee: NO-DES, Inc., Los Lunas, NM (US)

(*) Notice: Subject to any disclaimer, the term of this patent is extended or adjusted under 35 U.S.C. 154(b) by 10 days.

(21) Appl. No.: 16/745,815

(22) Filed: Jan. 17, 2020

(65) Prior Publication Data
US 2021/0221703 A1 Jul. 22, 2021

(51) Int. Cl.
*C02F 1/00* (2006.01)
*C02F 1/28* (2006.01)

(52) U.S. Cl.
CPC ............ *C02F 1/004* (2013.01); *C02F 1/283* (2013.01); *C02F 2201/005* (2013.01); *C02F 2201/008* (2013.01); *C02F 2209/40* (2013.01); *C02F 2301/046* (2013.01); *C02F 2303/14* (2013.01); *C02F 2307/14* (2013.01)

(58) Field of Classification Search
None
See application file for complete search history.

(56) References Cited

U.S. PATENT DOCUMENTS

| | | |
|---|---|---|
| 5,360,488 A | 11/1994 | Hieatt et al. |
| 6,627,089 B1 | 9/2003 | Wilkinson |
| 2004/0026339 A1* | 2/2004 | Hills ...................... B01D 35/30 210/742 |
| 2005/0171501 A1* | 8/2005 | Kelly ...................... C02F 9/005 604/500 |
| 2011/0031195 A1 | 2/2011 | Wilkinson |
| 2013/0055794 A1 | 3/2013 | Armour |

FOREIGN PATENT DOCUMENTS

| | | |
|---|---|---|
| CN | 104445686 | 3/2015 |
| ES | 2206032 | 5/2004 |

OTHER PUBLICATIONS

Young, Lee, "PCT International Search Report", PCT International Application No. PCT/US20/41559 filed on Jul. 10, 2020, dated Oct. 9, 2020, Alexandria, VA.
Young, Lee, "PCT Written Opinion of the International Searching Authority", PCT International Application No. PCT/US20/41559 filed on Jul. 10, 2020, dated Oct. 9, 2020, Alexandria, VA.

* cited by examiner

*Primary Examiner* — Richard C Gurtowski
(74) *Attorney, Agent, or Firm* — Woods Oviatt Gilman LLP; Dennis B. Danella, Esq.

(57) ABSTRACT

A closed conduit system for use in a water supply system includes a recirculating unit configured to connect to an isolated section between a first point and a second point of the water supply system. The recirculating unit includes a first filter unit defining a first closed circuit including the isolated section and adapted to perform a first treatment. A second filter unit defines a second closed circuit including the isolated section and is adapted to perform a second treatment. At least one pump is capable of generating a flow of water through the first and the second closed circuit, and a valve selectively controls flow through either the first or the second closed circuit.

18 Claims, 5 Drawing Sheets

WATER MAIN RECIRCULATING SYSTEM WITH FILTER BY-PASS AND ISOLATION AND METHOD OF USING SAME

FIELD OF THE INVENTION

The present invention relates to a method and equipment for inspecting, cleaning and maintaining a water main; and in particular to a closed conduit system including at least two flow paths and a filter by-pass and isolation manifold to selectively control water flow through the system, as well as to a method of inspecting, cleaning and/or maintaining a section of water main between hydrants while remaining under system pressure and using a circulating flushing fluid.

BACKGROUND OF THE INVENTION

Almost all water providers are required to have their mains large enough to provide a sufficient flow for fire protection. This means that the flow rate or velocities in the large mains during normal use are reduced significantly, allowing particulates to settle and aggregate at the bottom of the main and also substances such as iron, manganese, bio-film, etc. (collectively "substances") to adhere to the inside surfaces of the pipe. After a length of time the particulates and substances build up and, if there are any surges in the system, the particulates and substances are stirred up causing the water to appear dirty. To remedy this occurrence the entire system may be flushed annually from hydrants and blow-offs located throughout the entire system. This method wastes millions of gallons of water each year, may cause property damage, may flood streets causing traffic problems and is usually performed at night to avoid the public eye, making the flushing procedure very costly.

In addition to the above problems, new regulations require that the water be de-chlorinated before it is allowed to drain into any storm drainage system. A NPDES (National Pollutant Discharge Elimination System) permit is required and containment systems need to be in place to protect against washing silt and other materials into the storm drains.

Also, from time to time, it is necessary to flush water systems which deliver potable tap water. This is especially the case with newly installed water mains. Before water passing through a pipe can be used for drinking water purposes, it is necessary to thoroughly flush the mains with tap water. In order to maintain water quality, it is also necessary, from time to time, to flush local tap water delivery systems such as neighborhood and subdivision tap water systems.

Generally, discharges from potable water systems result from overflow, flushing, disinfection, hydrostatic testing, mechanical cleaning or dewatering of vessels or structures used to store or convey potable water. This frequently includes fire hydrant flushing in which high velocity streams are generated on the order of 2,000 gallons per minute for a period of 10-15 minutes. By periodically testing fire hydrants (fire flow testing), it can be determined if sufficient water is available in the system for firefighting purposes.

Additionally, potable tap water usually contains residual chlorine. The Federal Clean Water Act and state agency regulations regarding discharges of potable water, such as regulations promulgated by the Maryland Department of the Environment, require that total maximum daily amount of residual chlorine must be less than 0.1 mg/liter. At levels higher than 0.1 mg/liter, aquatic life is endangered and fish kills can occur. Since potable tap water and water discharged from fire hydrants which originates with county water systems is necessarily initially chlorinated, heavy discharges of this water will adversely affect aquatic life unless the amount of residual chlorine is reduced to less than 0.1 mg/liter. In the past, this was either not done or, when attempted, was done by injecting sodium sulfite into the discharge stream. This is a difficult process to perform and monitor because it is necessary to dispense sodium sulfite in controlled amounts according to the volume of water being treated. If there is too much sodium sulfite, it can itself cause pollution problems by interfering with pH levels and if the amount is insufficient, excessive residual chlorine will remain. It has been found that the injection approach requires not only highly skilled personnel, but extensive training. Moreover, the end result is unpredictable. Thus, while some attempts have been made at improving water main flushing systems, the real problems of water waste and water quality still remain to be addressed.

Thus, what is needed is a system for periodically inspecting, cleaning and maintaining water mains or other piping systems that does not require depressurization of the main and allows for filter by-pass and isolation to prevent wasting the water, or dumping water containing chemicals and pipe sediments into the environment during and following water main flushing and repair. The present invention addresses these, and other, needs.

SUMMARY OF THE INVENTION

In accordance with an aspect of the present invention, a closed conduit system for use in a water supply system includes a recirculating unit configured to connect to an isolated section between a first point and a second point of the water supply system. The recirculating unit includes a first filter unit defining a first closed circuit including the isolated section and adapted to perform a first treatment. A second filter unit defines a second closed circuit including the isolated section and is adapted to perform a second treatment. At least one pump is capable of pumping water through the first and the second closed circuit and a valve selectively controls flow to either the first or the second closed circuit. The isolated section of the water supply system may be defined between a first hydrant and a second hydrant and all of the water taken from the first point of the isolated section is returned to the second point of the isolated section.

In a further aspect of the present invention, each of the first filter unit and the second filter unit includes either particulate filter media or no filter element. By way of example, the first filter unit may include particulate filter media and the second filter unit may include granular activated carbon filter media.

In another aspect of the present invention, the recirculating unit is mounted on a vehicle. The recirculating unit may be configured to couple with a municipal water main, a private fire main, a recycled distribution water main or a municipal water storage tank. The pump may also be configured to pump the water counter-current to a normal water main flow current.

In still another aspect of the present invention, the recirculating unit may further include an injector adapted to add material to the flow of water in one or both of the first closed circuit and the second closed circuit. The material may be chlorine to disinfect or may be a de-chlorination agent, such as calcium thiosulfate.

In accordance with another aspect of the present invention, a method for testing, monitoring and/or cleaning a section of a water supply system includes isolating a section of the water supply system between a first point and a second point; connecting a recirculating unit to the first and second points, wherein the recirculating unit includes a first filter unit defining a first closed circuit and a second filter unit defining a second closed circuit; selectively controlling flow to either the first or the second closed circuit via a valve; and pumping water through the selected first or second closed circuit.

In one aspect of the invention, the water is pumped through the first closed circuit for a first period of time, wherein following the first period of time the valve is actuated to control flow to the second close circuit wherein the water is pumped through the second closed circuit for a second period of time. Each of the first filter unit and the second filter unit may include either particulate filter media or no filter element. For example, the first filter unit may include particulate filter media and the second filter unit may include granular activated carbon filter media.

In another aspect of the invention, the isolated section of the water supply system is defined between a first hydrant and a second hydrant and all of the water taken from the first point of the isolated section is returned to the second point of the isolated section. The recirculating unit may also be mounted on a vehicle.

BRIEF DESCRIPTION OF THE DRAWINGS

These and other details of my invention will be described in connection with the accompanying drawing, which is furnished only by way of illustration and not in limitation of the invention, and in which drawing.

DETAILED DESCRIPTION OF THE INVENTION

Figure 1:
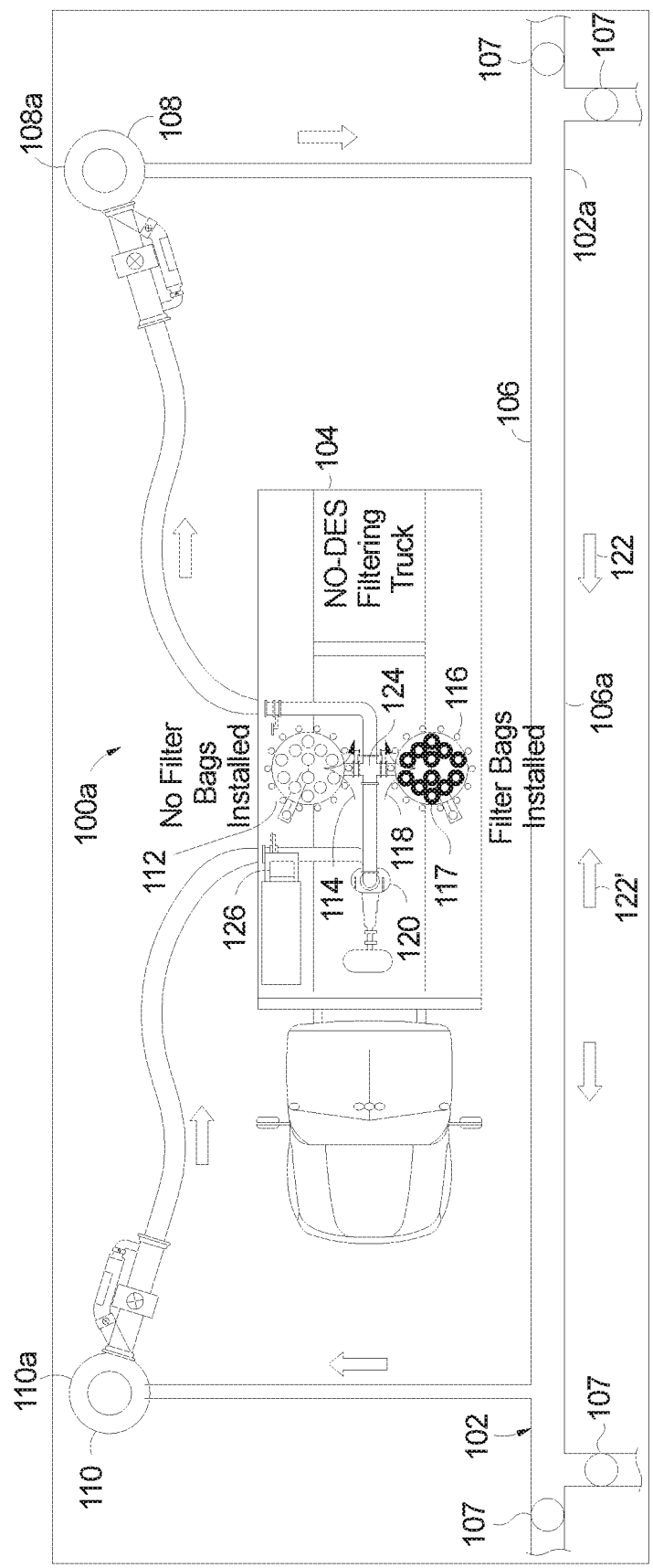
FIG. 1 is a top schematic view of an embodiment of a closed conduit system for use with a municipal water supply system in accordance with an aspect of the invention.
Figure 2:
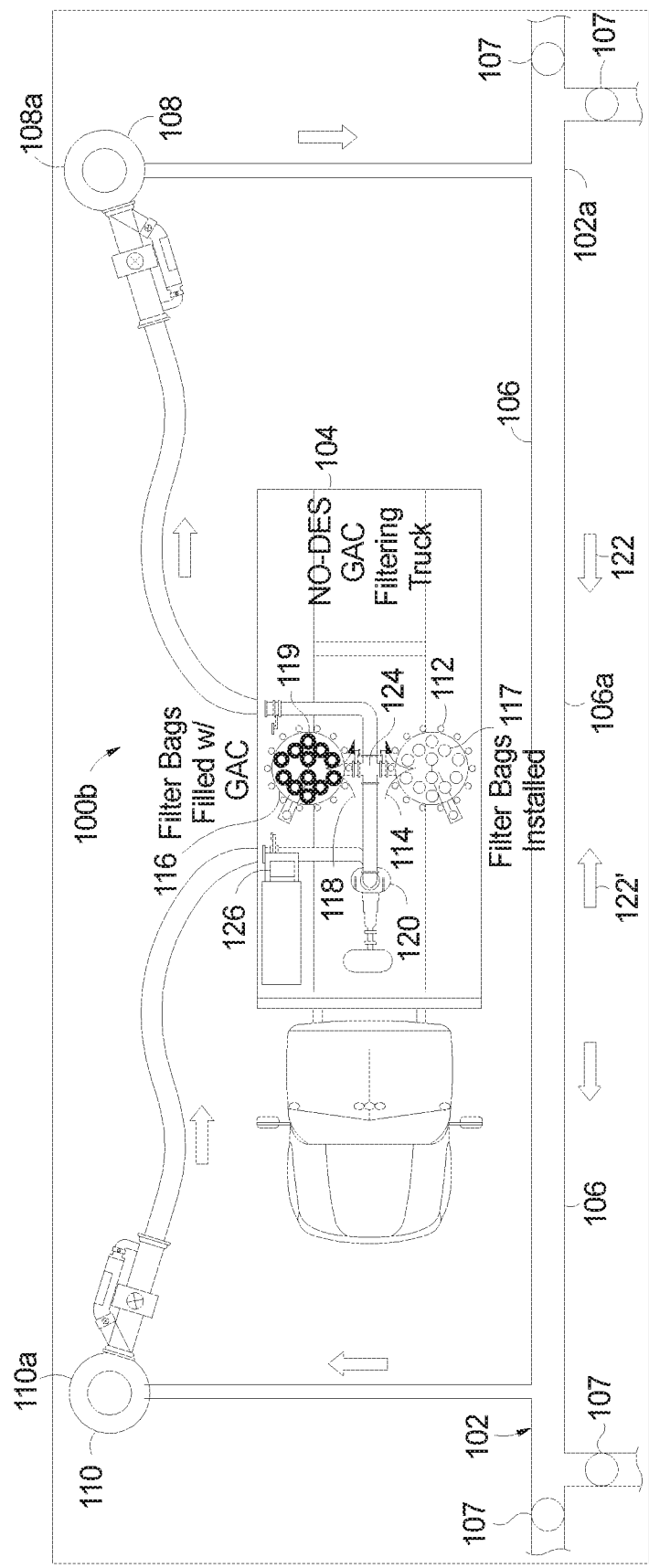
FIG. 2 is a top schematic view of an alternative embodiment of a closed conduit system for use with a municipal water supply system in accordance with an aspect of the invention.

As shown in the drawings, with particular to FIGS. 1-4, embodiments of a closed conduit system 100a-100d, respectively, for use in a water supply system 102 generally comprises a recirculating unit 104 configured to connect to an isolated section 106 of water supply system 102 between a first point 108 and a second point 110 while isolated section 106 remains under water supply system pressure. By way of example and with reference to FIGS. 1 and 2, isolated section 106 may be defined by closing of water system valves 107/107d. In accordance with an aspect of the present invention, recirculating unit 104 may include a first filter unit 112 which, in conjunction with isolated section 106, defines a first closed circuit 114. As will be discussed in greater detail below, a first treatment may be performed using first closed circuit 114. Recirculating unit 104 may also include a second filter unit 116 which, in conjunction with isolated section 106, defines a second closed circuit 118. Again, as will be discussed in greater detail below, a second treatment may be performed using second closed circuit 118. The first and second treatments may be the same of may be different. A pump unit 120 comprising one or more fluid pumps generates a circulating flow 122 of the pressurized system water, while valve 124 selectively controls the flow of circulating flow 122 through either first closed circuit 114 or second closed circuit 118. Pump unit 120 may also be controlled to generate a counter-current flow 122' which is reverse the normal water main flow current (e.g., flow 122).

Figure 3:
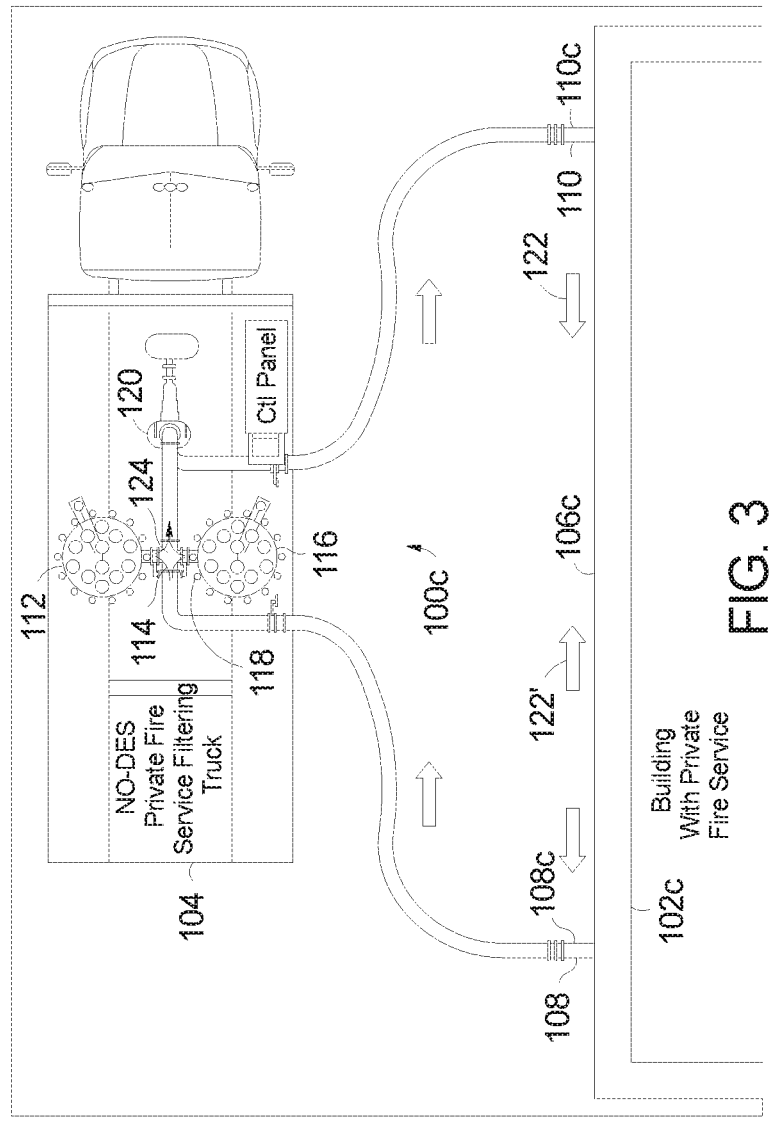
FIG. 3 is a top schematic view of an embodiment of a closed conduit system for use with a private fire water supply system.
Figure 4:
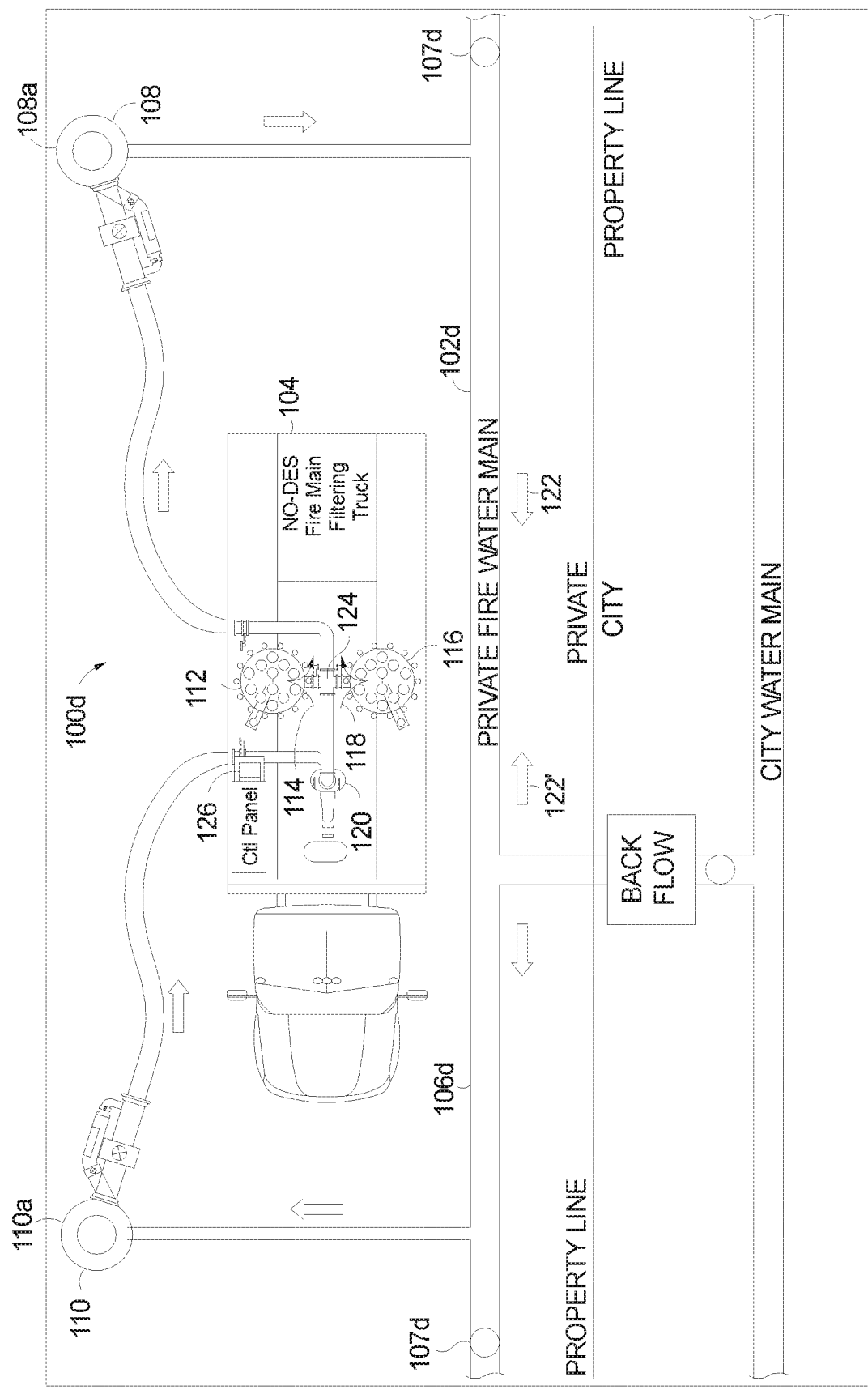
FIG. 4 is a top schematic view of an alternative embodiment of a closed conduit system for a private building fire service water supply system.

As can be seen in FIGS. 1 and 2, when used with a municipal water supply system 102a, first point 108 may be a first fire hydrant 108a while second point 110 may be a second fire hydrant 110a. However, as shown in FIG. 3, water supply system 102 may include a water system 102c located within a building having private fire service with hose hook-ups 108c, 110c, or more generally, a water system 102d including a private fire water main and first and second hydrants 108d, 110d, connected to municipal water supply system 102a. In any event, in accordance with an aspect of the present invention, all water extracted from first point 108a, 108c, 108d is returned to second point 110a, 110c, 110d such that little to no water is released from closed conduit system 100a-100d into the environment. Additional water supply systems, such as but not limited to a recycled distribution water main or municipal water storage tank (not shown) may similarly be coupled to a respective recirculating unit 104.

In accordance with an aspect of the present invention, recirculating unit 104 may comprise a mobile system with first and second filter units 112, 116 and pump 120 mounted on a vehicle, such as but not limited to a large bobtail truck, semi-truck/trailer, a trailer or other mobile conveyance. Moreover, as will described in greater detail below, one or both of first and second filter units 112, 116 may include a respective filter medium, or no medium, therein. While any suitable filter medium may be employed, in accordance with an aspect of the present invention, first and second filter units 112, 116 may selectively include one of: no filter media, particulate filter media 117 or granulated activated carbon filter media 119, depending upon system needs. Additionally, recirculating unit 104 may further include an injector 126 adapted to selectively add material to circulating flow 122/122'. By way of example and without limitation thereto, injector 126 may be adapted to add a chlorinating or de-chlorinating agent to circulation flow 122/122'.

Figure 5:
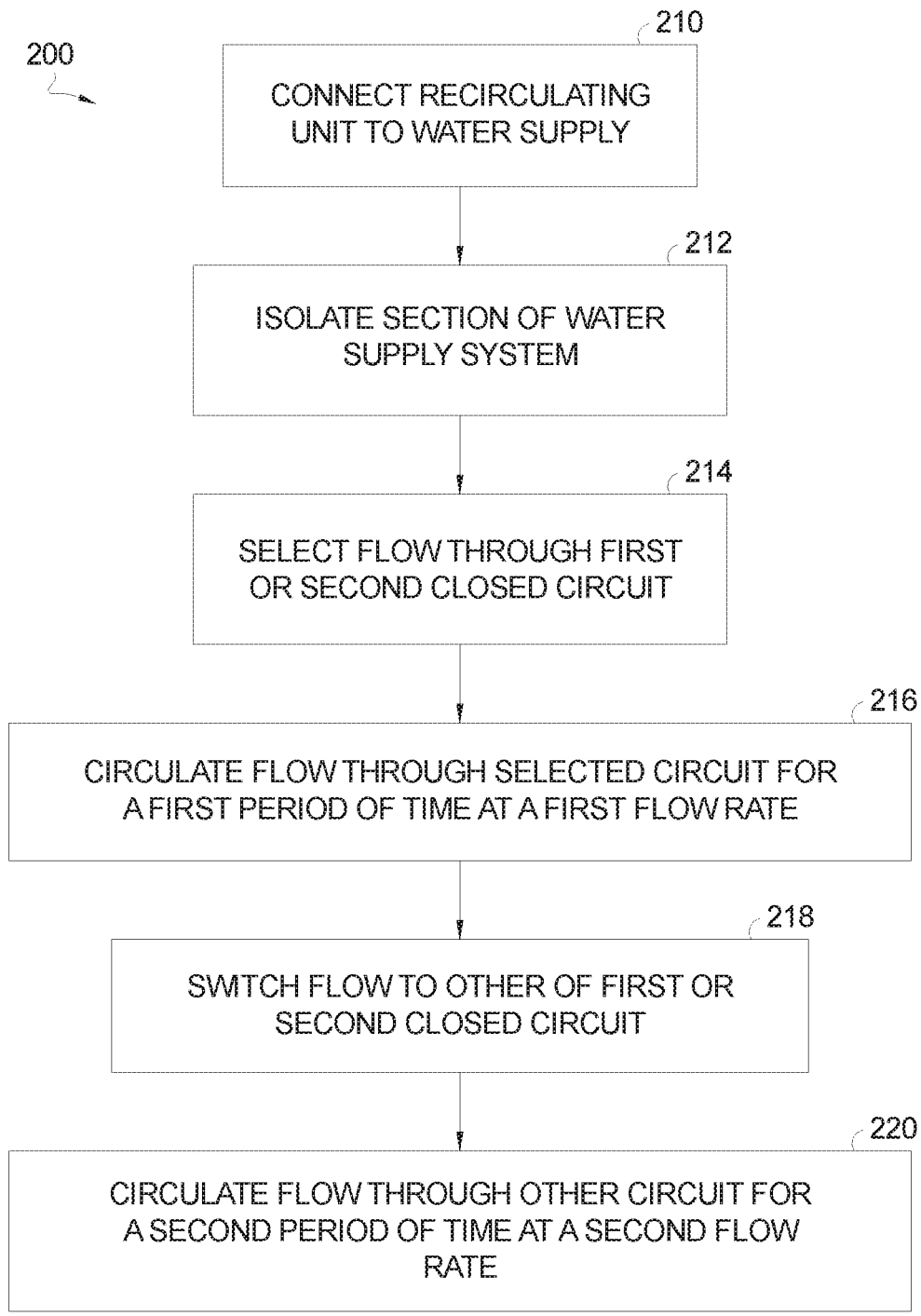
FIG. 5 is a flowchart of an exemplary method for testing, monitoring and/or cleaning a water supply system in accordance with an aspect of the invention.

Turning now to FIG. 5, a flowchart of an exemplary method 200 for testing, monitoring and/or cleaning a water supply system in accordance with an aspect of the invention is shown. Initially, at step 210, a recirculating unit, such as recirculating unit 104, is connected to a section (e.g., section 106) of a water supply system, such as water supply system 102, while water supply system 102 remains under system pressure. As described above, section 106 may be defined between a first point 108 and a second point 110. At step 212, section 106 is isolated, such as, for example, via closing of water system valves 107/107d, to thereby create a closed circuit including isolated section 106 and recirculating unit 104. As described above, recirculating unit 104 may include first filter unit 112, second filter unit 116, pump unit 120 and valve 124 so as to form two independent closed circuits, i.e., first filter unit 112 defining first closed circuit 114, and second filter unit 116 defining second closed circuit 118. As step 214, valve 124 is actuated so as to selectively control flow (e.g., circulating flow 122/122') to either first closed circuit 114 or second closed circuit 118. At step 216, pump unit 120 generates a circulating flow 122/122' of the pressurized system water through the closed circuit 114/118. It should be noted that steps 214 and 216 may be conducted in any order or simultaneously.

With continued reference to FIG. 5, in accordance with an aspect of the present invention, valve 124 is actuated so as to selectively control flow of circulating flow 122/122' through first closed circuit 114 (step 214). Pump unit 120 is controlled to produce a first circulating flow 122/122' having a first flow rate, such as for example and without limitation thereto, about 3 to 5 feet per second (step 216). First circulating flow 122/122' may be circulated through first closed circuit 114 for a first period of time, such as and without limitation thereto, about 5 to 10 minutes. At the expiration of the first period of time, valve 124 may then be actuated so as to selectively control flow of circulating flow 122/122' through second closed circuit 118 (step 218). Pump unit 120 may then be controlled to produce a second circulating flow 122/122' having a second flow rate (step 220). In accordance with an aspect of the present invention, pump unit 120 may be controlled such that the first flow rate is the same as or different than the second flow rate.

Non-limiting examples of applications of method 200 will now be discussed. It should be noted that these examples are not meant to limit the scope of the invention in any way. As described above with regard to systems 100a-100d, one or both of first and second filter units 112, 116 may include a respective filter medium, or no medium, therein. In one aspect of the present invention, first filter unit 112 may include particulate filter media 117 while second filter unit 116 may include granular activated carbon filter media 119. In this manner, circulating flow 122/122' may first be directed into first filter unit 112 via first closed circuit 114 (step 214) whereby the particulate filter media 117 within first filter unit 112 removes particulate matter, such as metal deposits, dirt, scale, etc. that may be within isolated section 106. Once the particulate matter has been satisfactorily removed (e.g., at the discretion of the operator or once the turbidity is sufficiently low enough to meet or exceed any applicable standards or regulations), valve 124 may be actuated to direct flow 122/122' through second closed circuit 118 which includes the second filter unit 116 having granular activated carbon filter media 119 therein. The granular activated carbon filter media 119 may then adsorb chemical contaminants in the water, such as organic compounds or other unwanted chemicals affecting the odor or taste of the water, such as hydrogen sulfide or chlorine.

In accordance with another non-limiting example of an application of method 200, first filter unit 112 may be configured so as not to include any filtering media therein. As such, following step 214, circulating flow 122/122' may pass through first filter unit 112 without experiencing any decrease in flow velocity which would normally occur should filter media be present. As a result, pump unit 120 may be controlled to output a circulating flow 122/122' having an ultra-high flow rate at step 216. In one aspect of the present invention, ultra-high shall mean a flow rate of at least 5 ft/sec, and more specifically, at least about 3 ft/sec to 5 ft/sec. Operating at an ultra-high flow rate for a first period of time (e.g., about 10 seconds to about 1 minute, and more particularly between about 15 second and 30 seconds) enables scouring of water mains (such as large diameter water mains having diameters greater than about 14 inches). Valve 124 may then be actuated at step 218 to direct flow through second closed circuit 118 which includes the second filter unit 116 having particulate filter media 117 therein, while pump unit 120 is controlled to reduce the velocity of circulating flow to the typical 3-5 feet per second. In this manner, materials scoured from the water main (isolated section 106) during step 216 may then be subsequently filtered out of the water stream via the second filter unit 116 during step 220. Accordingly, ultra-high flow scouring enables flushing of large diameter water mains while the water main remains under at least water system pressure during the flushing sequence.

It is understood that the preceding description is given merely by way of illustration and not in limitation of the invention and that various modifications may be made thereto without departing from the spirit of the invention as claimed.

What is claimed is:

1. A closed conduit system for use in a water supply system, the closed conduit system comprising: a recirculating unit configured to connect to a section of the water supply system between a first point and a second point, wherein the section remains under continuous water supply system pressure throughout operation of the closed conduit system, wherein the recirculating unit includes:
    a first filter unit defining a first circuit that includes the section, wherein the first filter unit is adapted to perform a first treatment,
    a second filter unit defining a second circuit that includes the section, wherein the second filter unit is adapted to perform a second treatment,
    at least one pump capable of generating a circulating flow of water through the section counter-current to a normal water main flow current, and
    a valve configured for being selectively disposed between a first position and a second position, wherein the valve controls the flow of the circulating flow of water through only the first filter unit when in the first position, and wherein the valve selectively controls the circulating flow of water through only the second filter unit when in the second position.

2. The closed conduit system of claim 1 wherein the section of the water supply system is defined between a first hydrant and a second hydrant.

3. The closed conduit system of claim 1 wherein all of the water which exits from the first point of the section is returned to the second point of the section throughout operation of the closed conduit system.

4. The closed conduit system of claim 1 wherein each of the first filter unit and the second filter unit includes either particulate filter media or no filter element.

5. The closed conduit system of claim 1 wherein the first filter unit includes particulate filter media and the second filter unit includes granular activated carbon filter media.

6. The closed conduit system of claim 1 wherein the recirculating unit is mounted on a vehicle.

7. The closed conduit system of claim 1 wherein the recirculating unit is configured to couple with a municipal water main, a private fire main, a recycled distribution water main or a municipal water storage tank.

8. The closed conduit system of claim 1 wherein the recirculating unit further includes:
    an injector adapted to add material to the flow of water in one or both of the first circuit and the second circuit.

9. A method for testing, monitoring and/or cleaning a water supply system, the method comprising:
    connecting a recirculating unit to a section of the water supply system between a first point and a second point, wherein the section remains under continuous water supply system pressure throughout the testing, monitoring and/or cleaning, and wherein the recirculating unit includes a first filter unit, a second filter unit, a valve and at least one pump;

forming a first circuit including the first filter unit of the recirculating unit and a second circuit including the second filter unit of the recirculating unit, wherein the valve is configured for being selectively disposed between a first position and a second position, wherein disposing the valve in the first position controls the flow of a circulating flow of water through only the first filter unit, and wherein disposing the valve in the second position controls the circulating flow of water only through the second filter unit;

selectively controlling flow to one of either the first circuit or the second circuit at a time by selectively disposing the valve in the first position or the second position, respectively; and circulating water through the selected first or second circuit using the at least one pump.

10. The method of claim 9 wherein the water is circulated through the first circuit for a first period of time, wherein following the first period of time the valve is actuated to control flow to the second circuit wherein the water is circulated through the second circuit for a second period of time.

11. The method of claim 10 wherein each of the first filter unit and the second filter unit includes either particulate filter media or no filter element.

12. The method of claim 10 wherein the first filter unit includes particulate filter media and the second filter unit includes granular activated carbon filter media.

13. A method for testing, monitoring and/or cleaning a water supply system, the method comprising:

connecting a recirculating unit to a section of the water supply system between a first point and a second point, wherein the section remains under continuous water supply system pressure throughout the testing, monitoring and/or cleaning, and wherein the recirculating unit includes a first filter unit, a second filter unit, a valve and at least one pump;

forming a first circuit including the first filter unit of the recirculating unit and a second circuit including the second filter unit of the recirculating unit, wherein the valve is configured for being selectively disposed between a first position and a second position, wherein disposing the valve in the first position controls the flow of a circulating flow of water through only the first filter unit, and wherein disposing the valve in the second position controls the circulating flow of water only through the second filter unit;

selectively controlling flow to one of either the first circuit or the second circuit at a time by selectively disposing the valve in the first position or the second position, respectively; and circulating water through the selected first or second circuit using the at least one pump, wherein the water is circulated through the first circuit for a first period of time, wherein following the first period of time the valve is actuated to control flow to the second circuit wherein the water is circulated through the second circuit for a second period of time, and wherein the water is initially circulated through the first circuit at a first flow rate with the first filter unit having no granular activated carbon filter media, and wherein the water is then circulated through the second circuit at a second flow rate with the second filter unit including particulate filter media, wherein the first flow rate is greater than the second flow rate.

14. The method of claim 11 wherein all of the water exiting from the first point of the section throughout the testing, monitoring and/or cleaning is returned to the second point of the section.

15. The method of claim 11 wherein the recirculating unit is mounted on a vehicle.

16. The method of claim 9 wherein the section of the water supply system is defined between a first hydrant and a second hydrant.

17. The method of claim 9 wherein the pump circulates the water counter-current to a normal water main flow current.

18. The method of claim 9 wherein the recirculating unit further includes an injector adapted to add material to the flow of water in one or both of the first circuit and the second circuit.

\* \* \* \* \*